(12) United States Patent
Jeong et al.

(10) Patent No.: US 11,345,299 B2
(45) Date of Patent: May 31, 2022

(54) ROOF CURTAIN AIRBAG FOR VEHICLE

(71) Applicant: HYUNDAI MOBIS CO., LTD., Seoul (KR)

(72) Inventors: Ga Ram Jeong, Yongin-si (KR); Hae Kwon Park, Yongin-si (KR); Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/118,542

(22) Filed: Dec. 10, 2020

(65) Prior Publication Data

US 2021/0197748 A1 Jul. 1, 2021

(30) Foreign Application Priority Data

Dec. 27, 2019 (KR) ........................ 10-2019-0175853

(51) Int. Cl.
| | | |
|---|---|---|
| *B60R 21/015* | (2006.01) | |
| *B60R 21/232* | (2011.01) | |
| *B60R 21/2338* | (2011.01) | |
| *B60R 21/214* | (2011.01) | |
| *B60R 21/261* | (2011.01) | |
| *B60R 21/01* | (2006.01) | |
| *B60R 21/231* | (2011.01) | |

(52) U.S. Cl.
CPC ...... *B60R 21/01554* (2014.10); *B60R 21/214* (2013.01); *B60R 21/232* (2013.01); *B60R 21/2338* (2013.01); *B60R 21/261* (2013.01); *B60R 2021/01238* (2013.01); *B60R 2021/23153* (2013.01); *B60R 2021/23161* (2013.01); *B60R 2021/23384* (2013.01)

(58) Field of Classification Search
CPC ............ B60R 21/01554; B60R 21/232; B60R 21/2338; B60R 21/214; B60R 21/261; B60R 2021/01238; B60R 2021/23161; B60R 2021/23384; B60R 2021/23153; B60R 21/213; B60R 21/231; B60R 21/2346; B60R 21/239; B60R 2021/21652
See application file for complete search history.

(56) References Cited

U.S. PATENT DOCUMENTS

| | | | |
|---|---|---|---|
| 8,328,228 B2 | 12/2012 | Lee et al. | |
| 10,688,955 B2 * | 6/2020 | Shin | B60R 21/232 |
| 11,066,032 B2 * | 7/2021 | Jaradi | B60R 21/239 |
| 2017/0282838 A1 * | 10/2017 | Jung | B60R 21/231 |
| 2019/0054888 A1 * | 2/2019 | Fu | B60R 21/232 |
| 2019/0106073 A1 | 4/2019 | Sundararajan et al. | |
| 2019/0161048 A1 * | 5/2019 | Thomas | B60R 21/215 |
| 2019/0299908 A1 * | 10/2019 | Farooq | B60R 21/232 |
| 2021/0009072 A1 * | 1/2021 | Hwangbo | B60R 21/261 |

FOREIGN PATENT DOCUMENTS

KR 10-2012-0033743 4/2012

* cited by examiner

*Primary Examiner* — Drew J Brown
(74) *Attorney, Agent, or Firm* — H.C. Park & Associates, PLC

(57) ABSTRACT

A roof curtain airbag for a vehicle includes an airbag cushion that is expanded to a space between passengers seated on respective seats when a plurality of seats are arranged to face each other, so that a collision between the passengers is prevented and the passengers are protected from impact by the airbag cushion.

20 Claims, 7 Drawing Sheets

ROOF CURTAIN AIRBAG FOR VEHICLE

CROSS-REFERENCE TO RELATED APPLICATION

This application claims priority from and the benefit of Korean Patent Application No 10-2019-0175853, filed Dec. 27, 2019, the entire contents of which is incorporated herein for all purposes by this reference.

BACKGROUND

Field

Exemplary embodiments relate generally to a roof curtain airbag for a vehicle, the roof curtain airbag being configured to protect passengers seated on respective seats when a traffic collision occurs in a situation in which a plurality of seats are arranged to face each other.

Discussion of the Background

In general, safety devices are installed in vehicles to secure the safety of a passenger from accidents such as collisions and rollovers. The safety devices include seat belts for restraining the body of the passenger and airbags for mitigating impact of the passenger when the passengers collide in a vehicle. Airbags are variously installed in each portion of the vehicle as needed, such as a driver's seat airbag installed in a steering wheel, a passenger seat airbag installed in an instrument panel of a passenger seat, etc.

Meanwhile, a vehicle is divided into a front space occupied by a front seat passenger and a rear space occupied by a rear seat passenger. When a traffic collision occurs, there is a problem that the rear seat passenger is moved forward by inertia, thereby causing a collision between passengers inside the vehicle.

In particular, in the case of an autonomous vehicle that has become more widespread, a position of a seat is configured to be variously adjusted in a 360-degree direction. Accordingly, the front seat passenger and the rear seat passenger are positioned to face each other, and passenger injury may occur due to collisions between the passengers when a traffic collision occurs in a situation in which the front seat passenger and the rear seat passenger face each other.

The foregoing is intended merely to aid in the understanding of the background of the present invention, and is not intended to mean that the present invention falls within the purview of the related art that is already known to those skilled in the art.

SUMMARY

Exemplary embodiments of the present invention has been made keeping in mind the above problems occurring in the related art, and the present invention is intended to propose a roof curtain airbag for a vehicle, wherein the roof curtain airbag is configured to prevent a collision between passengers in a situation in which seats are arranged to face each other, and to protect and restrain the passengers from impact.

In order to achieve the above objective, according to one aspect of the present invention, there is provided a roof curtain airbag for a vehicle. In the roof curtain airbag for a vehicle having an airbag cushion that may be configured to be expanded downward from a vehicle roof and to be arranged in a space between a plurality of seats, the airbag cushion may be configured to have an expansion shape in which a length of a lower portion of the airbag cushion is extended longer than that of an upper portion thereof, such that the upper portion may be extended in a facing direction of each seat and a length of the airbag cushion in the facing direction of each seat gradually may increase as the airbag cushion goes downward from the upper portion, so that a first end of the airbag cushion and a second end thereof may be extended to be inclined, and the airbag cushion having a through hole portion that may be open in a width direction of the airbag cushion at a center portion thereof.

The airbag cushion may be fixed to the vehicle roof by a plurality of brackets that may be spaced apart from each other in the vehicle roof in the facing direction of each seat.

As a length of the airbag cushion in the width direction thereof gradually increases downward from the upper portion thereof, a length in the width direction of the lower portion thereof may be configured longer than a length in the width direction of the upper portion thereof.

The airbag cushion may be configured such that the first end thereof and the second end thereof may be respectively extended downward to form extension portions.

The through hole of the airbag cushion may be extended in the facing direction of each seat, and opposite ends of the through hole portion may be extended to form upward bent shapes.

The airbag cushion may have a diffuser. The diffuser may be supplied with gas from an inflator, and have a first side bent portion extended toward the first end of the airbag cushion and a second side bent portion extended toward the second end thereof, so that the inflation gas may be dispersed toward the first end and the second end of the airbag cushion.

The diffuser may have a central bent portion, which may be extended downward and passes through the center portion of the airbag cushion, and then pass across the through hole portion to communicate with the lower portion of the airbag cushion.

The airbag cushion may include a first tether in which a first end thereof may be connected to the vehicle roof and a second end thereof may be connected to a first end-side lower portion of the airbag cushion; and a second tether in which a first end thereof may be connected to the vehicle roof and a second end thereof may be connected to a second end-side lower portion of the airbag cushion, and lengths of the first tether and the second tether may be configured shorter than a height between the upper portion and the lower portion of the airbag cushion when expansion of the airbag cushion is completed.

The roof curtain airbag may include a tether cutter in the vehicle roof. The tether cutter may be connected to the first and second tether, and configured to selectively cut the first and second tethers.

The roof curtain airbag may include a controller, which may be configured to receive information with respect to the plurality of seats, to control the tether cutter, and to control the tether cutter to cut the first and second tethers when a first seat and a second seat of the plurality of seats are positioned to face each other.

When the first seat of the plurality of seats may be positioned to be deviated from an expanded position of the airbag cushion and the second seat may be positioned within the expanded position thereof, the controller may control the tether cutter to cut the second tether, not the first tether.

When the first seat and the second seat may be positioned to be deviated from the expanded position of the airbag cushion, the controller may control the tether cutter not to cut the first tether and the second tether.

In the roof curtain airbag for a vehicle, which is configured to have the structure described above, the airbag cushion is expanded to a space between the passengers seated on respective seats when the plurality of seats are arranged to face each other, so that a collision between the passengers is prevented and the passengers are protected from impact by the airbag cushion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
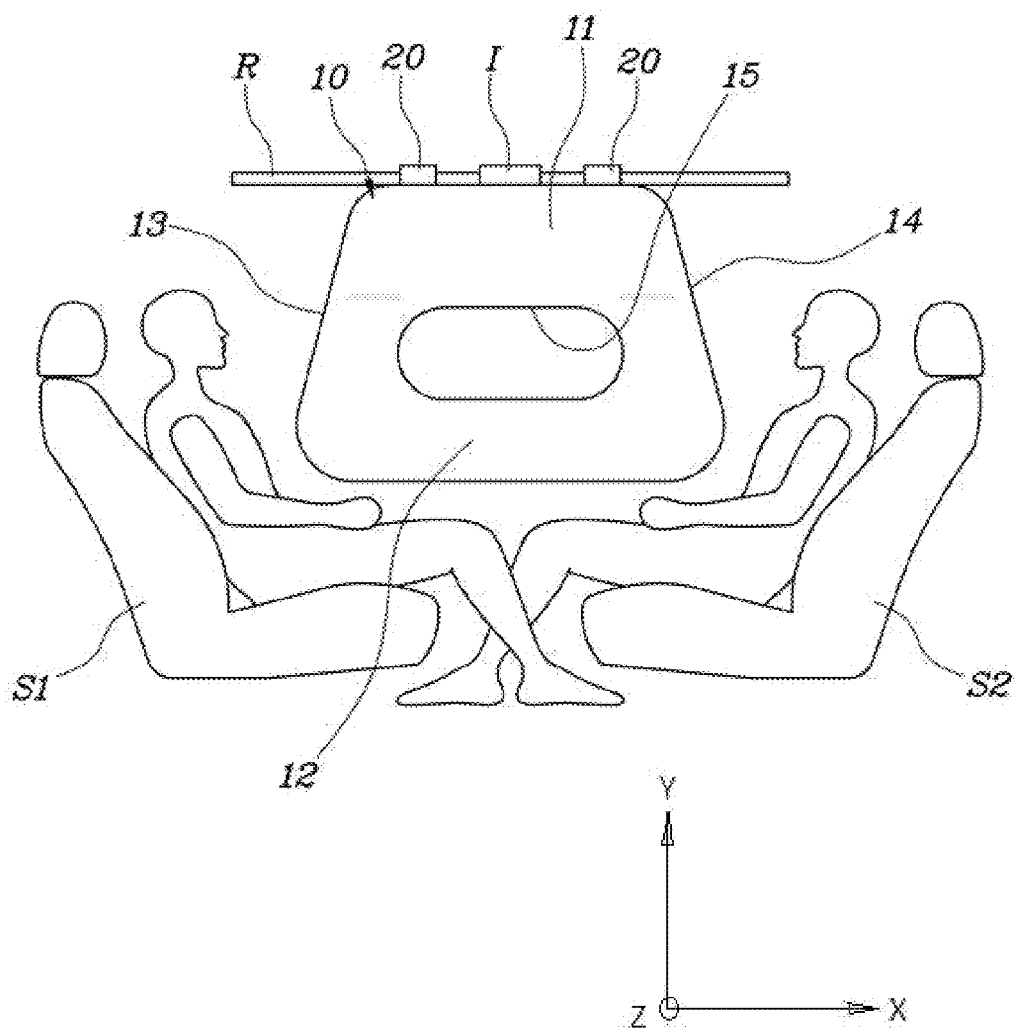
FIG. 1 is a view showing a roof curtain airbag for a vehicle according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinbelow, a roof curtain airbag for a vehicle according to exemplary embodiments of the present invention will be described with reference to the accompanying drawings.

Figure 2:
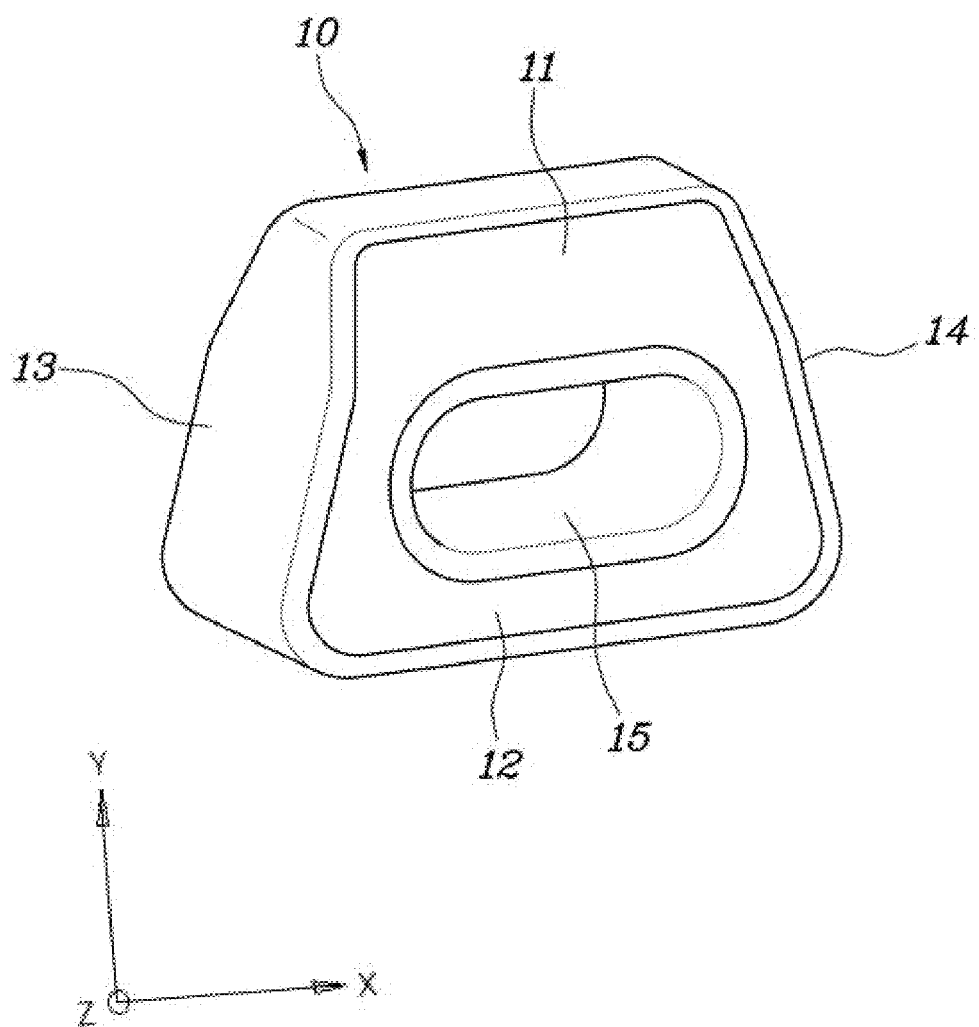
FIG. 2 is a view showing an airbag cushion according to the roof curtain airbag for a vehicle shown in FIG. 1.
Figure 3:
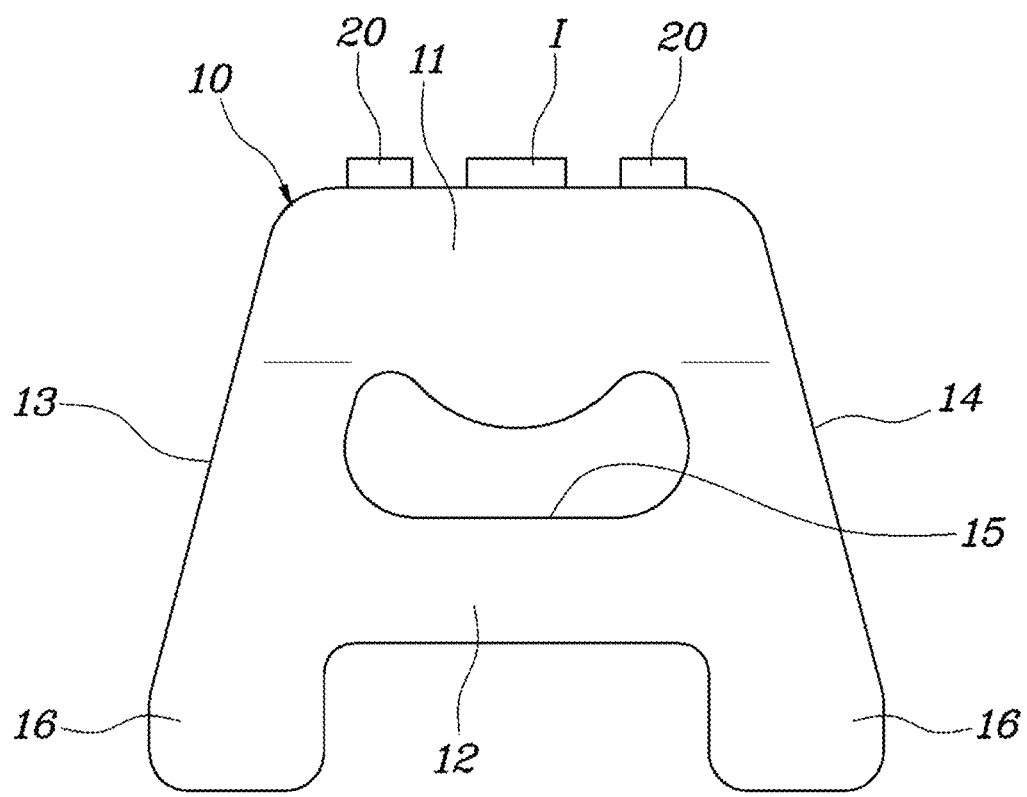
FIG. 3 is a view showing another embodiment of the airbag cushion according to the roof curtain airbag for a vehicle shown in FIG. 1.
Figure 4:
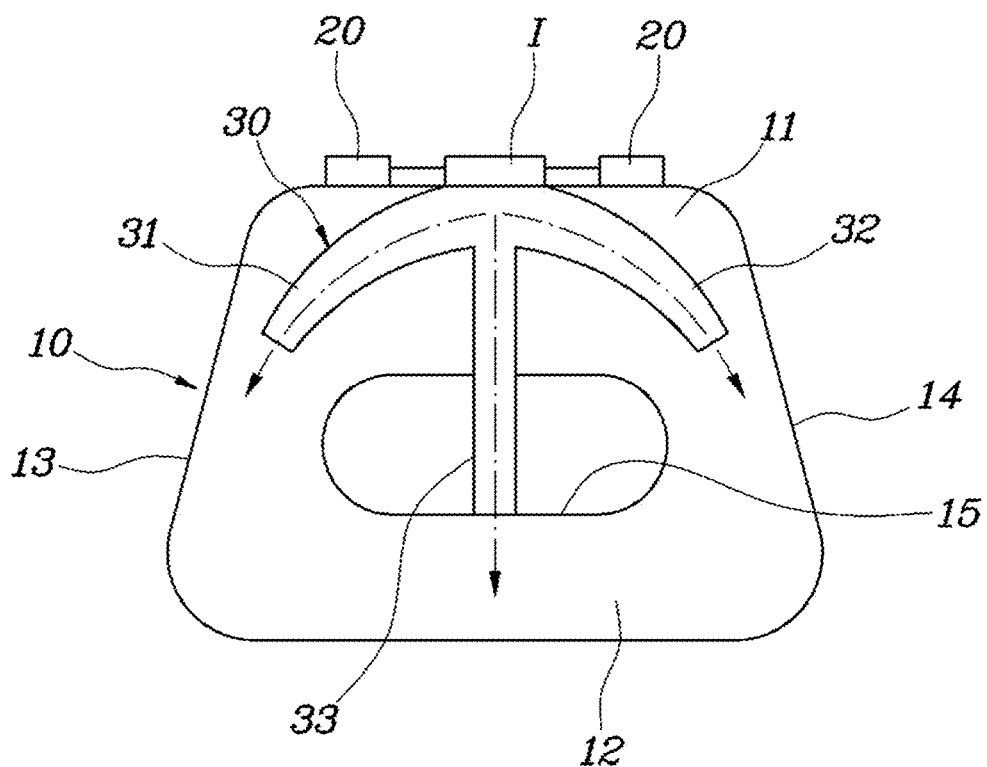
FIG. 4 is a view showing a diffuser of the roof curtain airbag for a vehicle shown in FIG. 1.
Figure 5:
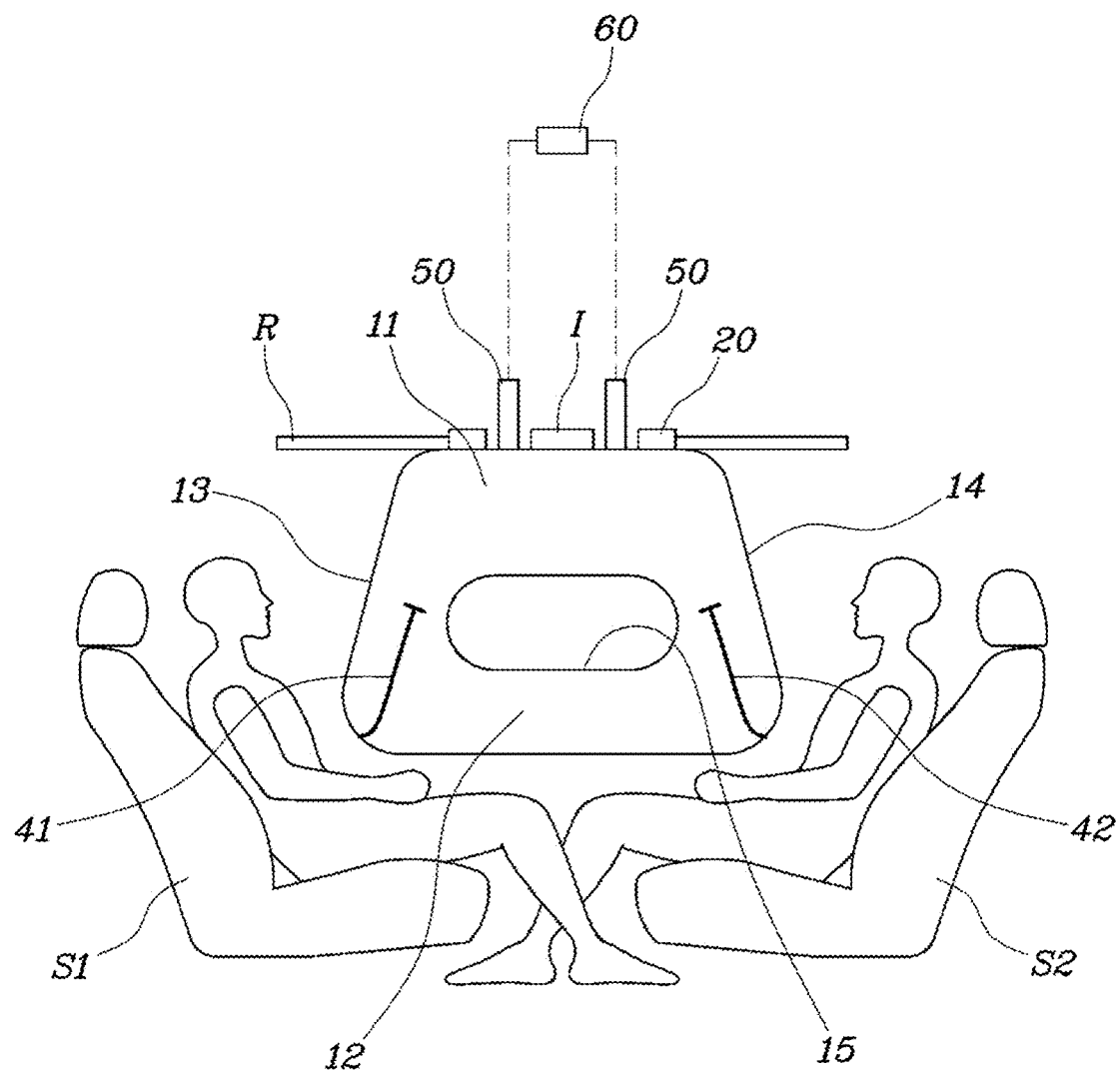
FIGS. 5, 6, and 7 are views showing embodiments with respect to cutting of each tether of the roof curtain airbag for a vehicle shown in FIG. 1.
Figure 6:
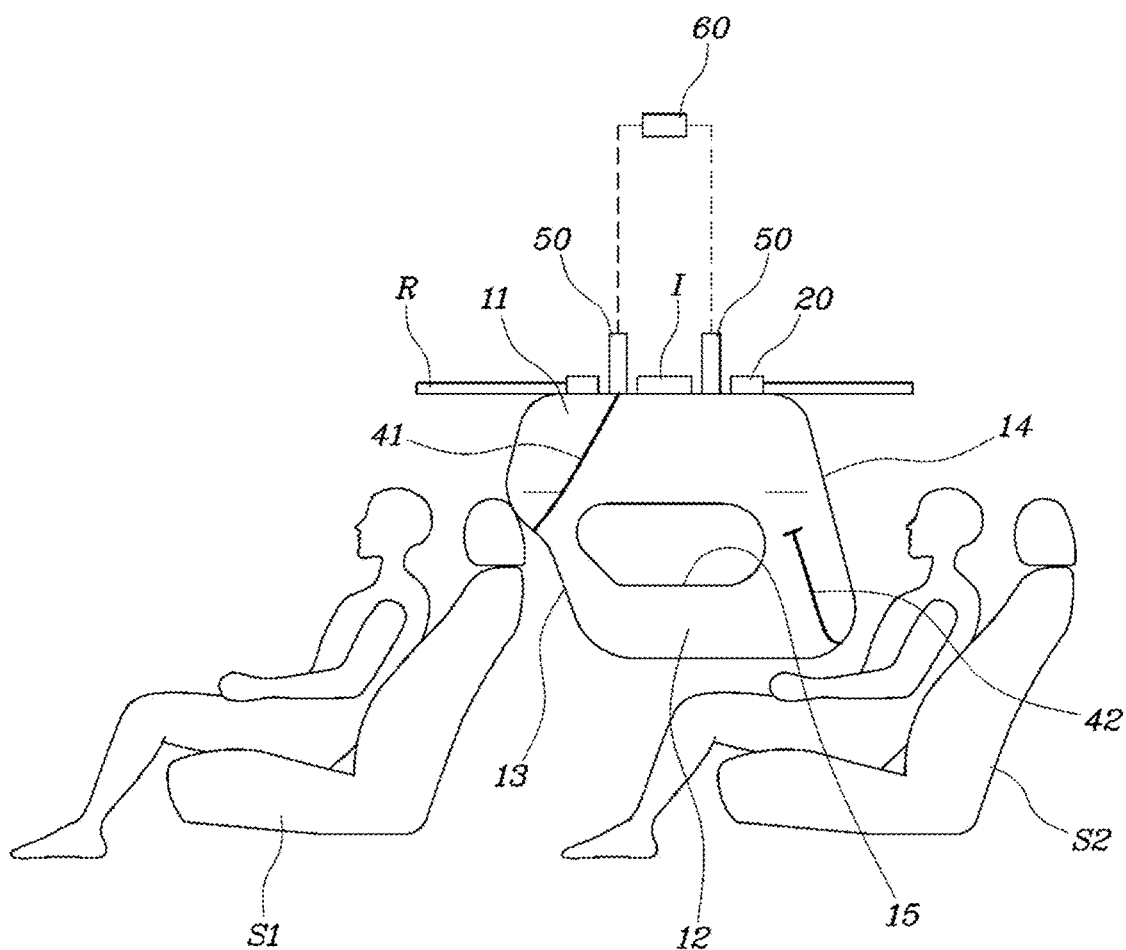
Figure 7:
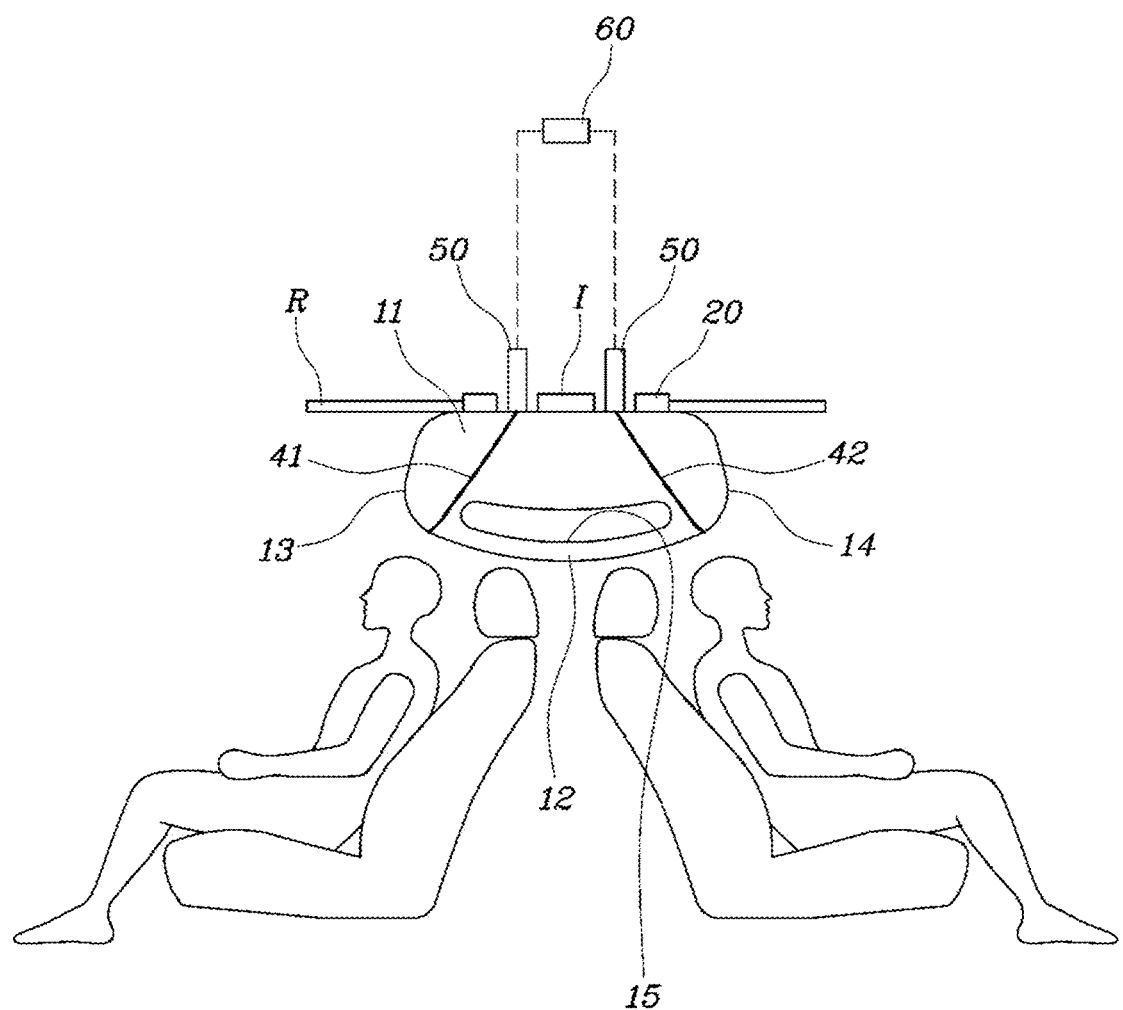

FIG. 1 is a view showing a roof curtain airbag for a vehicle according to the present invention. FIG. 2 is a view showing an airbag cushion according to the roof curtain airbag for a vehicle shown in FIG. 1. FIG. 3 is a view showing another embodiment of the airbag cushion according to the roof curtain airbag for a vehicle shown in FIG. 1. FIG. 4 is a view showing a diffuser of the roof curtain airbag for a vehicle shown in FIG. 1. FIGS. 5 to 7 are views showing embodiments with respect to cutting of each tether of the roof curtain airbag for a vehicle shown in FIG. 1.

As shown in FIGS. 1 and 2, the roof curtain airbag for a vehicle according to the present invention includes an airbag cushion 10 that is expanded downward and outward from a vehicle roof R and is arranged between a plurality of seats. The airbag cushion 10 has an expansion shape in which a length of a lower portion 12 is extended to be longer than that of an upper portion 11, such that the upper portion 11 thereof is extended in a facing direction of each seat and a length of the airbag cushion in the facing direction of each seat gradually increases as the airbag cushion extends downward from the upper portion 11. Therefore, a first end 13 of the airbag cushion and a second end 14 thereof are extended to be inclined, and the airbag cushion may have a through hole portion 15 that is open in a width direction of the airbag cushion at a center portion thereof. The downward direction may be considered the Y direction in the graph. The length direction being the X direction. The width direction, the Z direction, into and out of the page.

The airbag cushion 10 receives inflation gas from an inflator I installed in the vehicle roof R and is expanded downward and outward from the vehicle roof R. The airbag cushion is expanded in all three X, Y, and Z directions. The airbag cushion 10 is exploded toward a space between the plurality of seats, and has the expansion shape in which the upper portion 11 is extended in the facing direction of each seat and the length thereof increases as the airbag cushion 10 goes downward from the upper portion 11. Whereby, the upper portion 11 having a predetermined length is supported longitudinally on the vehicle roof R, so that the airbag cushion 10 is prevented from rotating unnecessarily on the vehicle roof R, and is brought into contact with a passenger seated in a seat while the lower portion 12 is arranged between the seats to safely protect the passenger. In addition, as the length of the airbag cushion 10 increases gradually from the upper portion 11 toward the lower portion 12, the first end 13 and the second end 14 are extended to be inclined. Accordingly, when contact would occur between passengers due to a traffic collision, upper bodies of the passengers are placed on slopes of the first end 13 and the second end 14, thereby stably protecting the passengers from colliding with each other or being unnecessarily tossed about the vehicle.

As described above, according to the present invention, the airbag cushion 10 is expanded downward and outward from the vehicle roof R and is arranged in the space between the seats, so that the passengers seated on the seats are prevented from colliding with each other.

As shown in FIG. 1, the airbag cushion 10 may be fixed to the vehicle roof R through a plurality of brackets 20 that are spaced apart from each other in the vehicle roof R in the facing direction of each seat.

In other words, the upper portion 11 of the airbag cushion 10 is configured to be extended in the facing direction of each seat from the vehicle roof R, and may be installed in the vehicle roof R using the brackets 20 that are spaced apart from each other in the extended direction of the upper portion 11. As described above, the plurality of brackets 20 are spaced apart from each other and are fixed to the upper portion 11 of the airbag cushion 10, thereby preventing unnecessary rotation of the airbag cushion 10 as the airbag cushion expands from the vehicle roof R toward each seat. In addition, the airbag cushion 10 may be firmly fixed to the vehicle roof R through the brackets 20.

Meanwhile, as shown in FIG. 2, as the length of the airbag cushion 10 gradually increases in the width direction (Z-direction) of the airbag cushion 10 from the upper portion 11 to the lower side, the width (in the Z-direction) of the lower portion may be wider than the width of the upper portion 11 in the Z direction. In other words, when the airbag cushion 10 is expanded from the vehicle roof R, areas in which the passengers seated on the seats are protected tend toward a lower side of the first end 13 and a lower side of the second end 14, although the entire airbag cushion 10 is the barrier. Whereby, the width of the upper portion 11 of the airbag cushion 10 is designed to be smaller than the width of the lower portion 12, which is configured to be longer, thereby securing the protection areas of the passengers.

Meanwhile, as shown in FIG. 3, the airbag cushion 10 may have the first end 13 and the second end 14 that are respectively extended downward and outward to form the extension portions 16. The extension portions 16 are configured to support lower bodies of the passengers when the airbag cushion 10 is expanded. Therefore, the extension portions 16 may be extended to the lower bodies of the passengers when the airbag cushion 10 is fully expanded.

In other words, the first end 13 and the second end 14 of the airbag cushion 10 have the extension portions 16 extended downward, so that the extension portions 16 support the lower bodies of the passengers when the airbag cushion 10 is fully expanded to prevent passenger injury due to lifting or movement of the lower bodies. In addition, since the airbag cushion 10 has the through hole portion 15 at a center portion thereof, when the passengers press the first end 13 or the second end 14, the lower portion 12 is bent. As the lower portion 12 of the airbag cushion 10 is bent and the extension portions 16 rotate toward the passengers seated on the seats, the passengers may be more firmly restrained.

For the above purpose, the through hole portion 15 of the airbag cushion 10 may be extended in the facing direction of each seat so that opposite ends of the through hole portion 15 may be extended to be bent upward. As the opposite ends of the through hole portion 15 of the airbag cushion 10 are extended to be bent upward, when the passengers press the first end 13 or the second end 14 of the airbag cushion 10 due to a traffic collision, the lower portion 12 of the airbag cushion 10 is bent along the bent shape of the through hole portion 15. In particular, as the lower portion 12 of the airbag cushion 10 is bent and the extension portions 16 rotate toward the passengers seated on the seats, positions of the passengers may be more firmly restrained.

Meanwhile, as shown in FIG. 4, the airbag cushion 10 may include a diffuser 30. The diffuser 30 is configured to be supplied with inflation gas from the inflator and to have a first side bent portion 31 extended toward the first end 13 and a second side bent portion 32 extended toward the second end 14, so that the inflation gas is dispersed toward the first end 13 and the second end 14 of the airbag cushion 10.

In other words, the airbag cushion 10 is configured to be expanded when the inflation gas is moved to the first end 13 and the second end 14. Therefore, the inflation gas may be supplied to the first end 13 and the second end 14 in order to secure expansion speed of the airbag cushion 10. For the above purpose, the airbag cushion 10 includes the diffuser 30 supplied with the inflation gas from the inflator, and the diffuser 30 includes the first side bent portion 31 extended toward the first end 13 and the second side bent portion 32 extended toward the second end 14. Whereby, the inflation gas is dispersed toward the first end 13 and the second end 14 of the airbag cushion 10. In addition, as unnecessary supply of the inflation gas prevented toward the through hole portion 15 that is a non-expansion area in the airbag cushion 10, the expansion speed of the airbag cushion 10 is improved.

In addition, the diffuser 30 may have a central bent portion 33, the central bent portion 33 extending downward, passing through the center portion of the airbag cushion 10, and then passing across the through hole portion 15 to communicate with the lower portion 12 of the airbag cushion 10.

As described above, the diffuser 30 has the central bent portion 33 extended to the lower portion 12 of the airbag cushion 10 across the through hole portion 15 of the airbag cushion 10, so that the inflation gas supplied from the inflator I is moved to the lower portion 12 of the airbag cushion 10 through the central bent portion 33 of the diffuser 30 and the expansion speed of the airbag cushion 10 is improved. In other words, the airbag cushion 10 is expanded when the gas supplied from the inflator I passes through the first end 13 and the second end 14 and is introduced into the lower portion 12, and the inflation gas is supplied firstly to the lower portion 12 of the airbag cushion 10 through the central bent portion 33 of the diffuser 30, so that the expansion speed of the airbag cushion 10 may be improved. In addition, the airbag cushion 10 is expanded downward and outward and then the first end 13 and the second end 14 are expanded toward each seat, thereby preventing passenger injury due to the expansion of the airbag cushion 10.

Meanwhile, as shown in FIG. 5, the airbag cushion 10 includes a first tether 41 in which a first end thereof is connected to the vehicle roof R and a second end thereof is connected to a first end-side lower portion 12 of the airbag cushion 10; and a second tether 42 in which a first end thereof is connected to the vehicle roof R and a second end thereof is connected to a second end-side lower portion 12 of the airbag cushion 10. After airbag cushion deployment, lengths of the first tether 41 and the second tether 42 may be shorter than a height between the upper portion 11 and the lower portion 12 of the airbag cushion 10 when expansion of the airbag cushion 10 is completed.

As described above, in the airbag cushion 10, as the first end 13 and the second end 14 are respectively connected to the first tether 41 and the second tether 42, when the airbag cushion 10 is expanded, the expansion shape of the airbag cushion 10 is determined by the first tether 41 and the second tether 42. In other words, when expansion of the airbag cushion 10 is completed, the lengths of the first tether 41 and the second tether 42 are shorter than the height between the upper portion 11 and the lower portion 12 of the airbag cushion 10, thereby limiting expansion of the airbag cushion 10 when the first tether 41 or the second tether 42 maintains a connected state thereof. Whereby, the airbag cushion 10 may have different expansion shapes in response to connected states of the first tether 41 and the second tether 42.

Further, a tether cutter 50 may be provided in the roof curtain airbag, the tether cutter 50 being installed in the vehicle roof R, connected to the first tether 41 and the second tether 42, and configured to selectively cut the first tether 41 and the second tether 42. The tether cutter 50 may consist of a cutting blade and an electromagnet to cut the first tether 41 or the second tether 42 when an electrical signal is input. One tether cutter 50 may be provided to selectively cut the first tether 41 or the second tether 42, and multiple tether cutters are provided for respective tether.

Therefore, depending on whether the tether cutter 50 cuts the first tether 41 or the second tether 42, the expansion shape of the airbag cushion 10 may be transformed.

In detail, a controller 60 may be provided in the present invention. The controller 60 receives information with respect to the plurality of seats, controls the tether cutter 50, and controls the tether cutter 50 to cut the first tether 41 and the second tether 42, when a first seat S1 and the second seat S2 of the plurality of seats are positioned to face each other. The controller 60 receives position information of each seat from a sensor installed on each seat, and controls the operation of the tether cutter 50 by transmitting an electrical signal to the tether cutter 50 on the basis of the seat position information.

As shown in FIG. 5, when the first seat S1 and the second seat S2 are positioned to face each other, the controller 60 allows the first tether 41 and the second tether 42 to be cut, so that the airbag cushion 10 is expanded without limitation by each tether. Therefore, the first end 13 and the second end 14 are expanded toward each seat, so that the airbag cushion 10 may safely protect the passengers seated on each seat.

Meanwhile, as shown in FIG. 6, among the plurality of seats, when the first seat S1 is deviated from the expanded position of the airbag cushion 10 and the second seat S2 is within the expanded position of the airbag cushion 10, the controller 60 may control the tether cutter 50 to cut the second tether 42, not the first tether 41.

In other words, when the first seat S1 is not within the expanded position of the airbag cushion 10, the airbag cushion 10 does not need to be expanded to the first seat S1. Therefore, the controller 60 controls the tether cutter 50 not to cut the first tether 41, thereby preventing the first end 13 of the airbag cushion 10 from being expanded downward by the first tether 41. Accordingly, when the airbag cushion 10 is expanded, expansion interference caused by contacting between the airbag cushion 10 and the first seat S1 may be prevented, and only a passenger seated on the second seat S2 may be safely protected. Use of the tethers enhances the flexibility of the airbag cushion 10 to be used in vehicles with various internal seating arrangements.

On the other hand, when the second seat S2 is deviated from the expanded position of the airbag cushion 10 and the first seat S1 is within the expanded position of the airbag cushion 10, the controller 60 controls the tether cutter 50 to cut the first tether 41, not the second tether 42. Accordingly, the airbag cushion 10 protects the passengers while avoiding an area in which the airbag cushion 10 does not need to be expanded.

Meanwhile, as shown in FIG. 7, when the first seat S1 and the second seat S2 are deviated from the expanded position of the airbag cushion 10, the controller 60 controls the tether cutter 50 not to cut the first tether 41 and the second tether 42.

As described above, when both the first seat S1 and the second seat S2 are not within the expanded position of the airbag cushion 10, the airbag cushion 10 does not need to be expanded toward each seat. In this case, the controller 60 controls the tether cutter 50 not to cut the first tether 41 nor the second tether 42. Accordingly, the airbag cushion 10 maintains the expanded state at an upper side of the first seat S1 and the second seat S2.

When the first seat S1 and the second seat S2 are deviated from the expanded position of the airbag cushion 10, the airbag cushion 10 may be not to be expanded. However, it is preferable that the airbag cushion 10 maintains the expanded state at the upper side of the seats to protect the passengers from various risk elements such as a vehicle rollover accident.

In the roof curtain airbag for a vehicle, which is configured to have the structure described above, the airbag cushion 10 is expanded to the space between the passengers seated on respective seats when the plurality of seats are arranged to face each other, so that a collision between the passengers is prevented and the passengers are protected from impact by the airbag cushion 10.

Although the preferred embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A roof curtain airbag comprising:
an airbag cushion configured to be expanded from a vehicle roof and arranged in a space between a plurality of seats into an expanded state, the airbag cushion comprising:
a lower portion and an upper portion wherein a length of the lower portion extends longer than a length of the upper portion, such that the upper portion is extended in a facing direction of each seat and a length of the airbag cushion in the facing direction of each seat gradually increases as the airbag cushion extends downward from the upper portion; and
a first end and a second end of the airbag cushion connected to the upper portion and the lower portion, the first end and the second end are extended to be inclined in an increasing length from the upper portion to the lower portion;
a through hole portion that is open in a width direction of the airbag cushion at a center portion thereof between the lower portion, upper portion, first end, and second end; and
a plurality of brackets that are spaced apart from each other in the vehicle roof in the facing direction of each seat,
wherein the airbag cushion is fixed to the vehicle roof by the plurality of brackets.

2. The roof curtain airbag of claim 1, wherein the airbag cushion is configured to have a greater width towards the lower portion in relation to the upper portion.

3. The roof curtain airbag of claim 1, wherein the airbag cushion is configured such that the first end thereof and the second end thereof are respectively extended downward to form extension portions.

4. The roof curtain airbag of claim 3, wherein the through hole portion of the airbag cushion is extended in the facing direction of each seat, and opposite ends of the through hole portion are extended to form upward bent shapes.

5. The roof curtain airbag of claim 1, wherein the airbag cushion further comprises:
a diffuser configured to be supplied with inflation gas from an inflator, and having a first side bent portion extended toward the first end of the airbag cushion and a second side bent portion extended toward the second end thereof, so that the inflation gas is dispersed toward the first end and the second end of the airbag cushion.

6. The roof curtain airbag of claim 5, wherein the diffuser has a central bent portion that is extended downward and passes through the center portion of the airbag cushion and passes across the through hole portion to communicate with the lower portion of the airbag cushion.

7. The roof curtain airbag of claim 1, wherein the airbag cushion further comprises:
a first tether in which a first end thereof is connected to the vehicle roof and a second end thereof is connected to a first end-side lower portion of the airbag cushion; and
a second tether in which a first end thereof is connected to the vehicle roof and a second end thereof is connected to a second end-side lower portion of the airbag cushion,
wherein lengths of the first tether and the second tether are configured shorter than a height between the upper portion and the lower portion of the airbag cushion when expansion of the airbag cushion is completed.

8. The roof curtain airbag of claim 7, further comprising:
a tether cutter provided in the vehicle roof, connected to the first and second tether, and configured to selectively cut the first and second tethers.

9. The roof curtain airbag of claim 8, further comprising:
a controller configured to:
receive information with respect to the plurality of seats;
control the tether cutter; and
control the tether cutter to cut the first and second tethers when a first seat and a second seat of the plurality of seats are positioned to face each other.

10. The roof curtain airbag of claim 9, wherein when the first seat of the plurality of seats is positioned to be deviated from an expanded position of the airbag cushion and the second seat is positioned within the expanded position thereof, the controller controls the tether cutter to cut the second tether, not the first tether.

11. The roof curtain airbag of claim 9, wherein when the first seat and the second seat are positioned to be deviated from the expanded position of the airbag cushion, the controller controls the tether cutter not to cut the first tether and the second tether.

12. A roof curtain airbag comprising:
an airbag cushion configured to be expanded from a vehicle roof and arranged in a space between a plurality of seats into an expanded state, the airbag cushion comprising:
a lower portion and an upper portion wherein a length of the lower portion extends longer than a length of the upper portion, such that the upper portion is extended in a facing direction of each seat and a length of the airbag cushion in the facing direction of each seat gradually increases as the airbag cushion extends downward from the upper portion; and
a first end and a second end of the airbag cushion connected to the upper portion and the lower portion, the first end and the second end are extended to be inclined in an increasing length from the upper portion to the lower portion;
a through hole portion that is open in a width direction of the airbag cushion at a center portion thereof between the lower portion, upper portion, first end, and second end; and
a diffuser configured to be supplied with inflation gas from an inflator, and having a first side bent portion extended toward the first end of the airbag cushion and a second side bent portion extended toward the second end thereof, so that the inflation gas is dispersed toward the first end and the second end of the airbag cushion.

13. The roof curtain airbag of claim 12, wherein the diffuser has a central bent portion that is extended downward and passes through the center portion of the airbag cushion and passes across the through hole portion to communicate with the lower portion of the airbag cushion.

14. The roof curtain airbag of claim 12, further comprising:
a plurality of brackets disposed in the vehicle roof,
wherein the airbag cushion is fixed to the vehicle roof by the plurality of brackets.

15. A roof curtain airbag comprising:
an airbag cushion configured to be expanded from a vehicle roof and arranged in a space between a plurality of seats into an expanded state, the airbag cushion comprising:
a lower portion and an upper portion wherein a length of the lower portion extends longer than a length of the upper portion, such that the upper portion is extended in a facing direction of each seat and a length of the airbag cushion in the facing direction of each seat gradually increases as the airbag cushion extends downward from the upper portion; and
a first end and a second end of the airbag cushion connected to the upper portion and the lower portion, the first end and the second end are extended to be inclined in an increasing length from the upper portion to the lower portion; and
a through hole portion that is open in a width direction of the airbag cushion at a center portion thereof between the lower portion, upper portion, first end, and second end,
wherein the airbag cushion further comprises:
a first tether in which a first end thereof is connected to the vehicle roof and a second end thereof is connected to a first end-side lower portion of the airbag cushion; and
a second tether in which a first end thereof is connected to the vehicle roof and a second end thereof is connected to a second end-side lower portion of the airbag cushion,
wherein lengths of the first tether and the second tether are configured shorter than a height between the upper portion and the lower portion of the airbag cushion when expansion of the airbag cushion is completed.

16. The roof curtain airbag of claim 15, further comprising:
a tether cutter provided in the vehicle roof, connected to the first and second tether, and configured to selectively cut the first and second tethers.

17. The roof curtain airbag of claim 16, further comprising:
a controller configured to:
receive information with respect to the plurality of seats;
control the tether cutter; and
control the tether cutter to cut the first and second tethers when a first seat and a second seat of the plurality of seats are positioned to face each other.

18. The roof curtain airbag of claim 17, wherein when the first seat of the plurality of seats is positioned to be deviated from an expanded position of the airbag cushion and the second seat is positioned within the expanded position thereof, the controller controls the tether cutter to cut the second tether, not the first tether.

19. The roof curtain airbag of claim 18, wherein when the first seat and the second seat are positioned to be deviated from the expanded position of the airbag cushion, the controller controls the tether cutter not to cut the first tether and the second tether.

20. The roof curtain airbag of claim 15, further comprising:
a plurality of brackets disposed in the vehicle roof,
wherein the airbag cushion is fixed to the vehicle roof by the plurality of brackets.

* * * * *